Oct. 6, 1931.  E. J. WITCHGER  1,825,987
RADIUS GAUGE
Filed Aug. 9, 1929

INVENTOR
EUGENE J. WITCHGER
ATTORNEY

Patented Oct. 6, 1931

1,825,987

UNITED STATES PATENT OFFICE

EUGENE J. WITCHGER, OF SAGINAW, MICHIGAN, ASSIGNOR TO LUFKIN RULE CO., OF SAGINAW, MICHIGAN, A CORPORATION OF MICHIGAN

RADIUS GAUGE

Application filed August 9, 1929. Serial No. 384,581.

This invention is a measuring instrument of the class commonly known as a radius gauge used by tool and die makers, templet layout men, pattern makers, machine screw operators and others, for determining the radius of inside and outside corners, locating the tangent lines of circles or cylinders and for like purposes.

The object of my invention is to produce as an article of manufacture a radius gauge made of one piece of metal of such shape as to be capable of being manufactured at small cost and presenting a maximum number of measuring elements each located on the gauge in a position that renders it most convenient to use on any given shape of work.

With this object in view the invention consists in the device illustrated in the accompanying drawings, in which Fig. 1 shows the gauge used for determining the radius of inside corners or fillets for one quarter of a circle or less.

Figure 1:
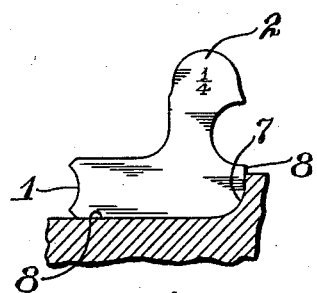

As is clearly shown in the drawings the gauge consists of a single piece of flat sheet metal, preferably rustless steel, cut to a general L-shaped form to present two legs projecting at right angles to each other.

Figure 5:
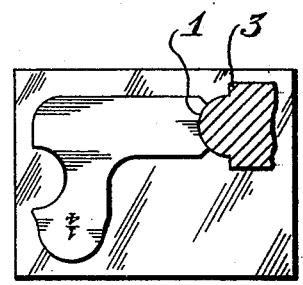
Fig. 5 shows the gauge employed to check a piece of work on a sheet of glass.

At an end of one leg is an internal form 1 for measuring ribs that include one quarter of a circumference or less and that have projections on them that will permit the use of an end gauge only. An example of the use of this end of the gauge with internal form is shown in Fig. 5, where the work has shoulders 3 that must be avoided by the gauge.

Figure 4:
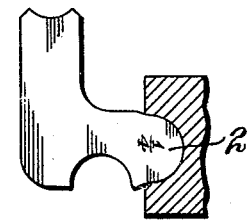
Fig. 4 shows the gauge employed to measure a concave groove of one half circle or less.

The extremity of the other leg of the gauge is provided with an external form gauge capable of use in grooves of one half circle or less, in the manner as shown in Fig. 4.

Figure 2:
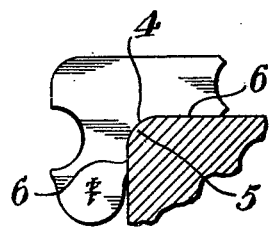
Fig. 2 shows the gauge used to determine the radius of an outside corner.

The inside corner of the gauge at the junction of the legs is provided with an internal form 4 for determining the radius of an outside corner as 5, Fig. 2, and also to show by means of the straight edges 6 whether the sides of the work are ninety degrees apart and tangent to the circle of the corners. The outer corner of the L-shaped plate is made with an external form 7, Fig. 1, for determining the radius of inside corners or fillets for one quarter of a circle or less.

The straight edges 8 are ninety degrees apart and are used for checking the location of the side walls of the work with relation to the fillet.

Figure 3:
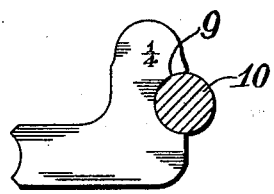
Fig. 3 shows the gauge applied to determine the side of one half of a circumference.

The outer margin of one of the legs of the instrument is made with an internal form 9, the use of which is shown in Fig. 3, for determining the size of one half of a circumference on a shaft 10.

All of the internal and external forms on any one gauge are preferably one size, the one shown in the drawings being one quarter inch.

With this instrument liability of error and confusion as to size is avoided. Requiring a check on fillets and beads or ribs of any given size, the workman selects the gauge of that size and employs it for all of the possible measurements presented by a given piece of work. He can make five different kinds of measurements without liability of error or confusion, because only one gauge is being handled. Moreover, when one form is being used the other leg of the gauge serves as a convenient handle for the instrument. The inner and outer corner forms 4 and 7 of the L-shaped instrument, having marginal edges at right angles to each other and tangent to the included curves, enables the accuracy of the walls of the work, as well as the accuracy of the fillets and grooves, to be checked.

The gauge can be cut from a single piece of metal with a minimum of waste and is relatively inexpensive to manufacture considering the fact that each instrument provides for five different kinds of measurements.

Having thus described my invention, what

I claim and desire to secure by Letters Patent is:

A radius gauge comprising a single piece of metal formed to present two leg members whose marginal edges are disposed at right angles to each other, and provided with an internal and an external formed gauge at their respective inner and outer intersecting margins, the end of one leg shaped to a concave gauge form, the end of the other leg shaped to a convex gauge form and the side member of one of said legs, intermediate its ends, shaped to concave gauge form, all of said gauge forms being of the same radius.

In testimony whereof, I affix my signature.

EUGENE J. WITCHGER.